United States Patent [19]

Judd et al.

[11] Patent Number: 4,890,314
[45] Date of Patent: Dec. 26, 1989

[54] TELECONFERENCE FACILITY WITH HIGH RESOLUTION VIDEO DISPLAY

[75] Inventors: Thomas H. Judd, Madison; Lanny S. Smoot, Morristown, both of N.J.

[73] Assignee: Bell Communications Research, Inc., Livingston, N.J.

[21] Appl. No.: 237,501

[22] Filed: Aug. 26, 1988

[51] Int. Cl.$^4$ .............................................. H04N 7/14
[52] U.S. Cl. ..................................... 379/53; 358/87; 358/231
[58] Field of Search ...................... 379/53, 54; 358/85, 358/87, 213.11, 213.13, 60, 64, 231

[56] References Cited

U.S. PATENT DOCUMENTS

| | | | |
|---|---|---|---|
| 3,291,905 | 12/1966 | Smith | 358/87 |
| 4,322,741 | 3/1982 | Kawabayashi | 358/87 |
| 4,323,925 | 4/1982 | Abell et al. | 358/213.13 X |
| 4,635,105 | 1/1987 | Favreau | 358/64 X |
| 4,734,779 | 3/1988 | Levis et al. | 358/231 |
| 4,797,942 | 1/1989 | Burt | 358/87 X |

FOREIGN PATENT DOCUMENTS 60-213178  10/1985  Japan ..................................... 358/87

OTHER PUBLICATIONS

Bernard A. Wright, "The Design of Picturephone® Meeting Service (PMS) Conferencing Centers for Video Teleconferencing," *IEEE Communications Magazine*, Mar. 1983, pp. 30–36.
Brochure, "Imtech Digital Videowall System", ©1987, Imtech International, Inc., N.Y.

*Primary Examiner*—Keith E. George
*Attorney, Agent, or Firm*—James W. Falk

[57] ABSTRACT

A station for use in a teleconferencing system is disclosed. The station includes an arrangement comprising a plurality of image sensing devices, each of which provides a sub-image. The sub-images are joined to form a single high resolution video display. Illustratively, the arrangement comprises a plurality of image sensing devices and one or more mirrors to insure that the fields of view of the image sensing devices are contiguous at all relevant distances. Alternatively, an array of image sensing devices may be utilized wherein the horizontal and vertical scans of the devices are cropped.

14 Claims, 11 Drawing Sheets

TELECONFERENCE FACILITY WITH HIGH RESOLUTION VIDEO DISPLAY

FIELD OF THE INVENTION

The present invention relates to a teleconferencing system. More particularly, the present invention relates to a teleconferencing station including high resolution video display and to special camera arrangements utilized to implement the high resolution video display.

BACKGROUND OF THE INVENTION

Since the beginnings of wired (and later wireless) communications, an implicit goal of the communication whether it was telegraphy, telephony, television or the various versions of "video-phone", was to bring the participants at the ends of the communication as "close together" as possible. This is also the goal of traditional teleconferencing systems. Ideally, the effect obtained in good communication should be one of "being there". Presently, efforts are being directed to the development of teleconferencing systems that are suited for casual and spontaneous communication, rather than scheduled communications.

To contrast casual and scheduled communications, one might use the traditional teleconferencing experience as an example of a scheduled interchange. Participants are generally known to each other (and are often collaborating) well in advance of their use of the teleconference facility. They make arrangements to participate in a teleconference on a specific day, at a specific time, usually to avoid physical travel between their respective locations. Casual or spontaneous communications occur on the other hand, when two or more persons meet with each other on an unplanned informal basis.

The traditional teleconference facility is generally a shared, extremely high cost facility (one reason for its tightly scheduled usage). The facility itself puts extreme limitations on the normal human protocols for interaction. Most facilities offer some version of NTSC (home television like) video display on relatively small sized monitors. When the number of teleconference participants at a sending end of a conference is larger than one, the image of each participant occupies a small portion of an already small viewing area. As a result, it becomes difficult for viewers at the receiving end of such an image to pick up non-verbal cues from the speaker's face and body. Indeed, in many cases it is often difficult to discern who of the many participants is actually speaking.

The audio in most teleconference facilities has been of the half-duplex (one direction at a time) type. An "audio gate" determines the instantaneous direction of transmission. Generally the loudest noise source at the two ends of the conference determines the originating end of the link. The reason for the simplex operation is to prevent feedback from the speakers to the microphones at each end of the conference. Although the gated half-duplex link is effective in preventing feedback it causes several problems. First, it prevents speakers at one end of a teleconference from being able to interrupt speakers at the other end and simultaneously hear the results of their own interrupt. Another problem is that any loud and unplanned noise at one end (sneezing, the ruffling of papers, a book falling to the floor) will often gate the conversation path in the wrong direction. Since all participants of the teleconference generally understand the problem, they begin to try to accommodate to it and speak in an unnatural and chopped mode instead of the usual free flow conversational mode of interaction.

It is an object of the present invention to provide a teleconferencing system which overcomes the problems or prior art teleconferencing systems and which enables groups of participants at both ends of a teleconference link to casually communicate. It is a further object of the present invention to provide a high resolution video display for use in connection with the teleconferencing system and special camera arrangements for implementing the high resolution video display.

SUMMARY OF THE INVENTION

The present invention is a teleconferencing system which is especially suited for casual communications between groups of participants at either end of a telecommunications link. The teleconferencing system provides video and audio communications for the groups of participants. Illustratively, common conference rooms and lounges may be adapted for use with the inventive teleconferencing system.

In such a room, one wall may be adapted as a high resolution video display. The image allows participants at the other end of a teleconference to appear almost lifesized. The high resolution display has a wider aspect ratio than standard NTSC video to match the generally wider, than taller, view of side-by-side seated conference participants.

One candidate for providing such a high resolution, wide aspect ratio video image is High Definition Television (HDTV) equipment. Unfortunately, the present high cost, and high transmission bandwidth (approximately 1 Gbp/s for digital transmission and 30 Mhz for analog transmission) and the requirements for high lighting levels at the conference sites make presently available HDTV equipment unsuitable for casual teleconferencing applications.

An alternative approach to forming a high resolution image involves using two or more cameras to produce a signal with more resolution (i.e. more pixels) than a single camera. In such a system, each camera has a projector or other display device associated therewith to produce a sub-image which occupies a portion of the high resolution video display. When arranged properly, the sub-images provided by the various cameras may be positioned adjacent to one another to form a high resolution component image. In an illustrative embodiment, the video images for the high resolution display at each end of a teleconference line are formed by simultaneously projecting form the rear separate (side-by-side) NTSC video images on a single screen which is of width to height ratio of about 8:3.

There are several problems associated with the use of a plurality of cameras to produce a single high resolution video image. One problem is that the plurality of cameras cannot simply be placed side by side. Such an arrangement of cameras results in a complicated overlapping of the fields of view of the cameras so that there are some spatial locations which are in the field of view of no camera and other spatial locations which are in the field of view of more than one camera. As a result, the sub-images produced by the individual cameras cannot simply be placed adjacent to one another to produce a high resolution video image of a particular scene. A further problem is that when sub-images are positioned adjacent one another, there may be combination artifacts such as an undesired overlap at the boundaries of the sub-images.

In accordance with an illustrative embodiment of the present invention, a high resolution display is formed using a mirror system which permits a plurality of cameras to be positioned at different locations in space so that their fields of view are contiguous for all relevant distances and so that the fields of view appear to originate from the same location in space. In this case, the sub-images produced by the individual cameras may be positioned adjacent one another to form a single high resolution video image. For example, a large aspect ratio high resolution image comprising left and right half-images may be formed utilizing two cameras and the appropriate mirror system. A gating circuit which controls the start of the video information during each horizontal scan of a camera may be utilized to eliminate combination artifacts where the left and right halfimages meet.

In an alternative embodiment of the invention, a high resolution image may be formed using an array of image pickup devices. The image pickup devices scan an image located in a plane in which the fields of view of the devices slightly overlap. The image may for example comprise a document or alternatively a moving scene may be projected onto a translucent screen located in the plane using a lens system. The horizontal and/or vertical scans of the image pickup devices are cropped to eliminate overlap between the sub-images produced by the various image pickup devices and to optimally merge the various sub-images into a single high resolution video image.

As indicated above, the teleconferencing station is directed to casual communications. In particular, when common areas such as lounges or conference rooms are set up as teleconferencing stations using the high resolution display of the present invention, and connected by a teleconference link, casual communications takes place between common area users on both sides of the link. A participant at one end of the link simply looks at the large aspect ratio, high resolution display to see the participants on the other end of the link.

DETAILED DESCRIPTION OF THE INVENTION

A. Overview of a Teleconferencing Station

Figure 1:
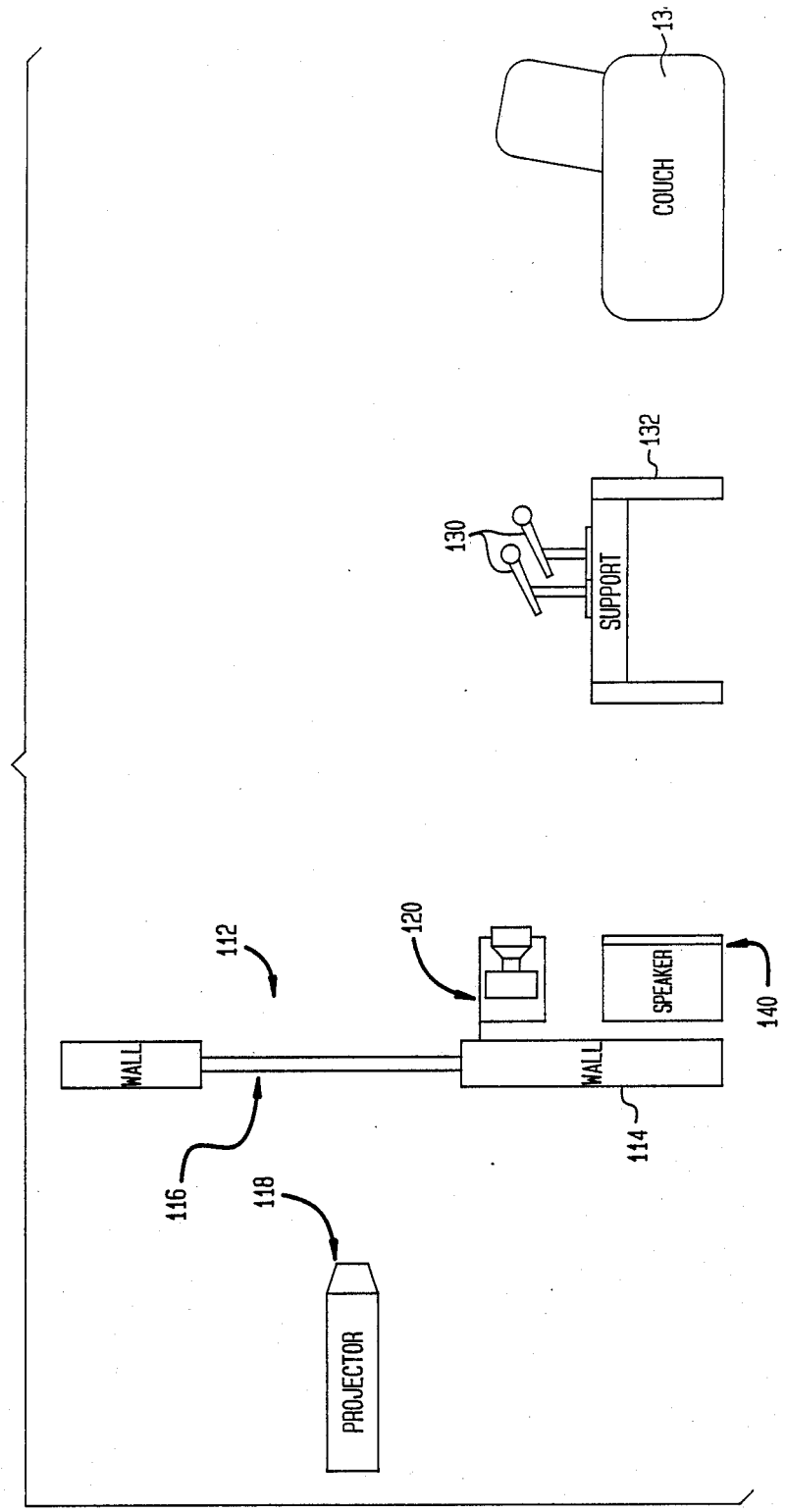
FIG. 1 schematically illustrates a station at one end of a teleconference link, in accordance with an illustrative embodiment of the present invention.

Turning to FIG. 1, an overview of an inventive teleconferencing station 100 is illustrated. A high resolution video display 112 is formed by removing a portion of a wall 114 of the room containing the station 100. More particularly, a portion of the wall 114 is removed and a translucent screen 116 is inserted into the resulting opening.

Illustratively, a pair of projectors 118 are arranged side by side (so that only one is visible in FIG. 1) to provide a high resolution, wide aspect ratio video image on the screen 116. Thus, users of the conference station 110 can look at the video display 112 and see approximately life-size images of teleconference participants at another station at the other end of a teleconference link.

The screen size is preferably chosen to be as large as the moderately priced projector technology will allow while providing good brightness. The projectors (e.g. VB-3000 models from Kloss Video Corporation) have a unique Schmidt optics system which allow high brightness and good spacial resolution. Each projector has an especially short projection throw of approximately 60". Illustratively, the screen 116 is 8 feet wide by approximately 3 feet tall. The screen, as indicated above, is mounted in a cutout in one of the walls of the room with the lower edge of the screen approximately 3 feet from the floor.

The station 100 includes a camera arrangement 120 which enables teleconference participants at the other end of a teleconference link to view the scene at the station 100 using a high resolution display similar to that shown in FIG. 1. The camera arrangement 120 preferably includes at least two cameras or other image sensing devices to provide fairly complete coverage of what is going on in the room.

In order to allow full time two-way talking (full duplex) audio operation as well as to provide broad "speaker" coverage and excellent spacial voice imaging, a plurality (e.g. four) separate audio channels may be utilized. To prevent the usual feedback problems, a number of steps may be taken. For example, a plurality of directional microphones 130 are employed, each microphone (if there are four channels, there are a total of four microphones) being directed towards a separate sector of the conference area. (For purposes of clarity only two microphones 130 are shown in FIG. 1) Secondly, a small amount of delay (approximately 4 msec.) is introduced in one direction of each audio channel which provides additional protection against feedback. Finally, graphic equalizers (not shown) may be employed in each audio path to "notch out" room resonances which may cause frequency selective oscillations. The microphones 130 are illustratively mounted on a support structure 132 to provide wide coverage of an activity area represented by the couch area 134. Note the station 100 also includes four speakers 140 to receive audio signals transmitted from another teleconference station via the audio channels.

A particularly important feature in this connection is the use of the large aspect ratio high resolution video display which enables video interaction between remote uses to occur casually. For example, remotely located, but collaborating research teams can be in permanent video contact through use of the video display.

B. Camera and Mirror Arrangements for Forming High Resolution Displays

Figure 2:
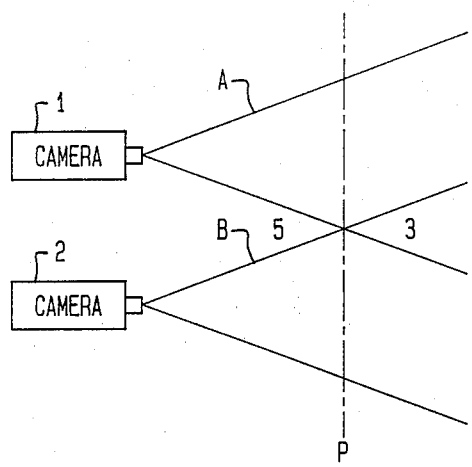
FIG. 2 schematically illustrates the fields of view of two video cameras positioned adjacent one another.

As indicated above, a high resolution video display can be achieved using multiple cameras. FIG. 2 illustrates the problems encountered when multiple cameras are simply placed adjacent one another. Thus, in FIG. 2, two video cameras 1 and 2 are positioned adjacent one another. Cone A defines the field of view of camera 1 and cone B defines the field of view of camera 2. The fields of view are contiguous only in Plane P, elsewhere as in region 3, the fields of view overlap, while in region 5 neither camera offers coverage. Thus, a high resolution video display can only be formed of an image located in Plane P. In general, however, it is desirable to display in a high resolution manner scenes having a variety of locations relative to the cameras.

Figure 3:
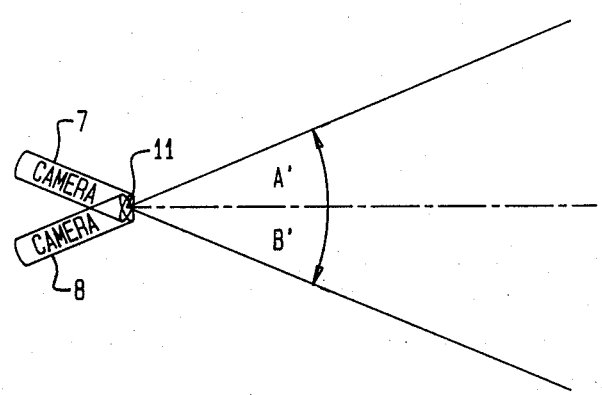
FIG. 3 schematically illustrates the fields of view two cameras would have if they occupied the same physical location.

Consider the use of a pair of cameras 7 and 8 arranged as in FIG. 3, rather than side-by-side as in FIG. 2. Clearly, if the front nodal points of the lenses of cameras 7 and 8 could both be placed at point 11, the angle between cameras could be adjusted so that the respective fields of view, A' and B' are exactly contiguous for all distances from the point 11. In this case, a scene located an arbitrary distance from the two cameras is segmented by the two cameras. The outputs of the two cameras can then be combined to form a high resolution video display comprising two image segments, each segment being produced by one camera. The problem is that it is not possible to place two real lenses in the same physical location. However, real cameras may be placed at different locations and, through use of a mirror system, their fields of view can be made to appear to originate from the same point.

Figure 4:
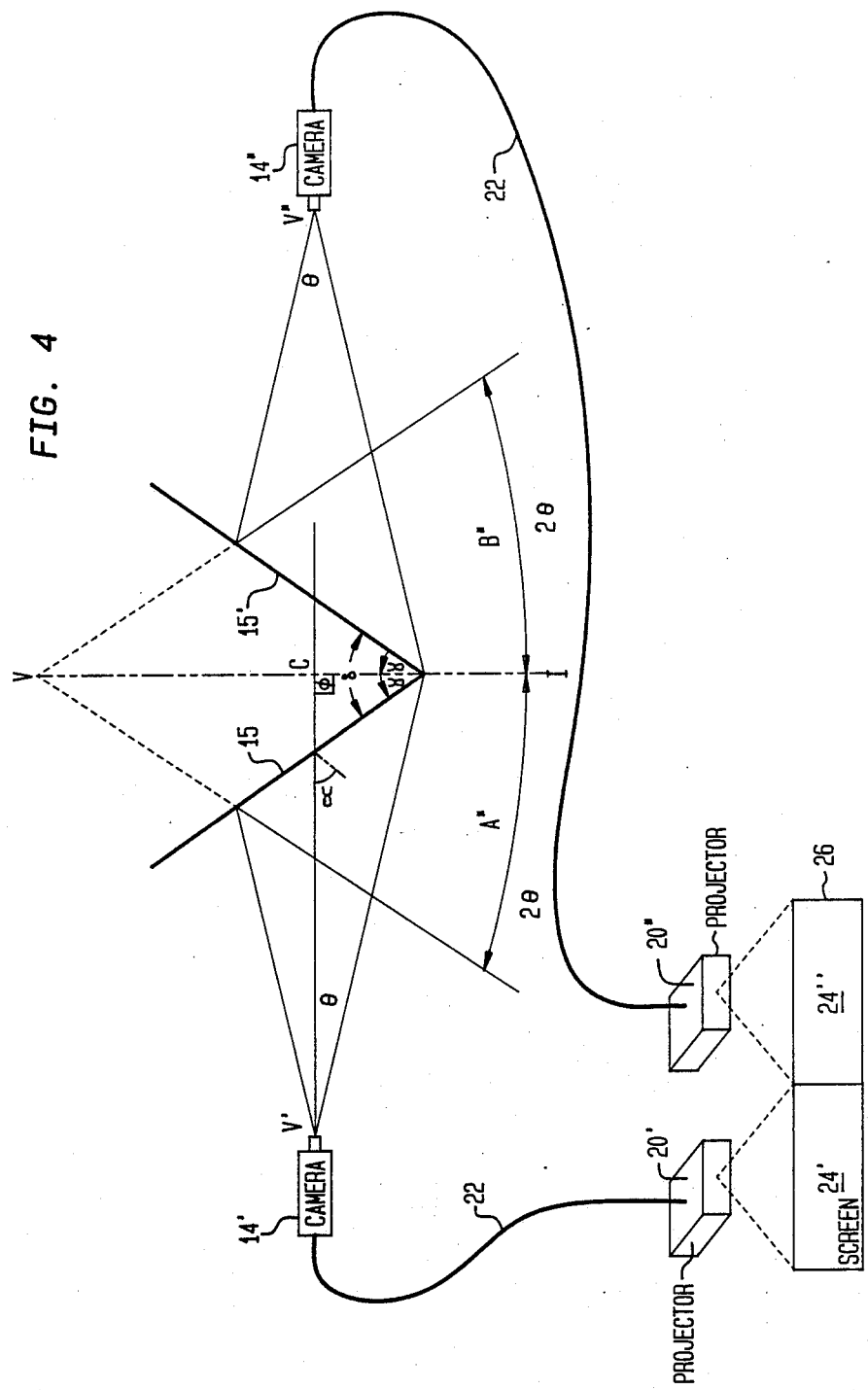
FIG. 4 schematically illustrates a first mirror and camera arrangement for producing a high resolution video image, in accordance with an illustrative embodiment of the present invention.

An illustrative arrangement for accomplishing this is shown in FIG. 4. In FIG. 4, the cameras 14', 14", located at points V'" and V"', each have a lens that has a half angle acceptance of $\theta$. The optical axis V'CV" is perpendicular to the system center line CI. A mirror 15 is placed at angle $\gamma$ to CI such that the outermost ray V'P is deflected to coincide with the center line CI. Similarly, a mirror 15' is placed at an angle $\gamma$ to CI such that the outermost ray V"'P is deflected to coincide with the center line CI. Using $\phi=9020$, geometric analysis reveals that $$\alpha = \frac{90 - \theta}{2} \text{ and that } \alpha = \gamma$$

where $\alpha$ is the angle of incidence of the central rays from the points V',V"'. Further, define $\delta$ to equal total angle between the two mirrors in the complete system, $\delta=2\gamma$, so $\delta=90-\theta$ where $\theta$ is the half-acceptance angle of the camera lenses.

Figure 5:
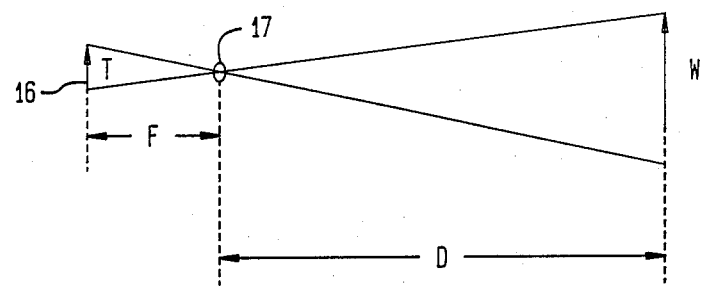
FIG. 5 schematically illustrates the geometry of a video camera.

To evaluate the angle $\delta$, it is useful to consider the basic optics of a video camera as illustrated in FIG. 5. A typical camera includes an image pickup device 16 such as a CCD device of width T. The image pickup device 16 receives the image from lens 17 of focal length F. The object 18 has a width W and is at distance D from the lens 17 where $D>>F$. Then trigonometric relations yield.

$$\tan \theta = \frac{W}{2D} = \frac{T}{2F}, \text{ or}$$

$$\theta = \tan^{-1}\left(\frac{T}{2F}\right)$$

Illustratively, T=8.8mm. For a normal lens, F=16mm, so $\theta=15.4°$. Thus, the two cameras 14', 14" of FIG. 4 will produce the desired contiguous fields of view if pointed at mirrors separated by angle $\delta=90°-15.4°=74.6°$. With this geometry, the field of view A" of camera 14' and the field of view B" of camera 14" are exactly contiguous at all relevant distances. Both fields of view appear to originate from point V in FIG. 4. Referring again to FIG. 4, note that each camera 14', 14" has a projector 20', 20" associated therewith. The cameras and projectors may be separated by a teleconference link schematically represented by the lines 22. The projectors form two adjoining images 24' and 24" on two adjoining portions of a display device 26 to form a single high resolution video image.

Figure 14:
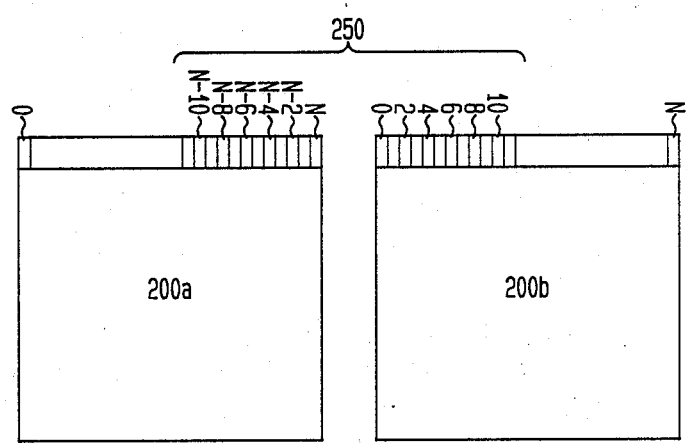
FIGS. 14 and 15 schematically illustrate techniques for merging images formed by adjacent image pickup devices.

The two cameras of FIG. 14', 14" of FIG. 4 each with lenses having half angle of acceptance $\theta$ will produce images 24', 24" that can be projected side-by-side with an apparent acceptance angle of $4\theta$. If each camera has an aspect ratio of 4:3, the resulting image will have aspect ratio 8:3. Assume each of the cameras is an ordinary NTSC camera, each having a 4:3 aspect ratio, approximately 320 lines/picture height horizontal resolution, and approximately 480 active scan lines. The composite image thus will have (4/3)(320)(2)=853 total lines horizontal resolution. The important principle here is: given two image sensors of state-of-the-art resolution, we can double the horizontal resolution by combining them in the manner of FIG. 4. By using two such systems with a total of four image sensors, the state-of-the-art resolution can be doubled both horizontally and vertically.

In particular circumstances, there are two problems which can arise with the arrangement of FIG. 4. First, the angle $\delta$ may be difficult to construct accurately. Second, the images from the two cameras 14', 14" will be reversed left to right because of the mirrors 15,15'.

The second problem can be solved by modifying the cameras 14', 14" to reverse their scanning or by modifying the display projectors 20',20" to reverse their scanning. Alternatively, (see FIG. 7 below) a second mirror may be placed in front of each camera so that in fact there are two reversals for each image. The first problem can be eased by arranging the system with a somewhat different geometry so that the angle $\delta$ is set equal to 90°.

Figure 6:
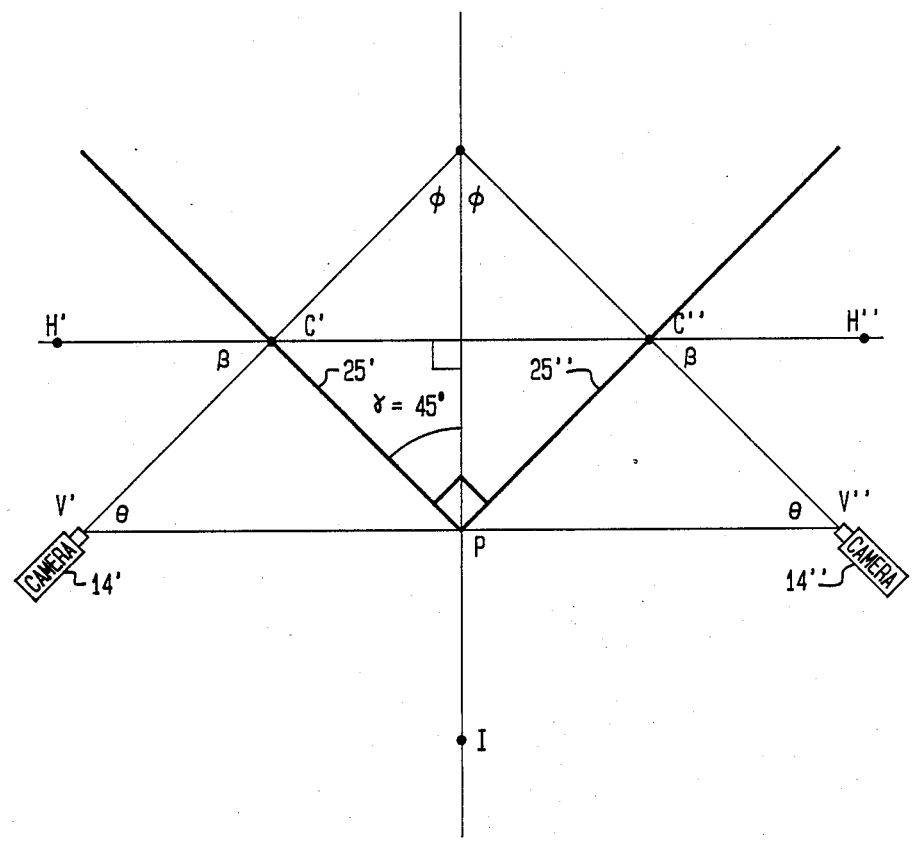
FIGS. 6 and 7 schematically illustrate a second mirror and camera arrangement for producing a high resolution video image, in accordance with an illustrative embodiment of the present invention.

In FIG. 6, the mirrors 25',25" are oriented at 90° with respect to each other. The line H'C'C"H" is parallel to the outermost ray V'P of the camera 14' and the outermost ray V"'P from the camera 14". Thus $\beta=\theta$ and the camera axes V'C' and V"'C" are oriented at angle $\phi$ from the system center line PI where $\phi=90°-\beta=90°-\theta$. The arrangement of FIG. 6 is substantially easier to construct than the arrangement of FIG. 4 because the mirrors 25′,25″ of FIG. 6 are oriented at 90° with respect to each other.

Figure 7:
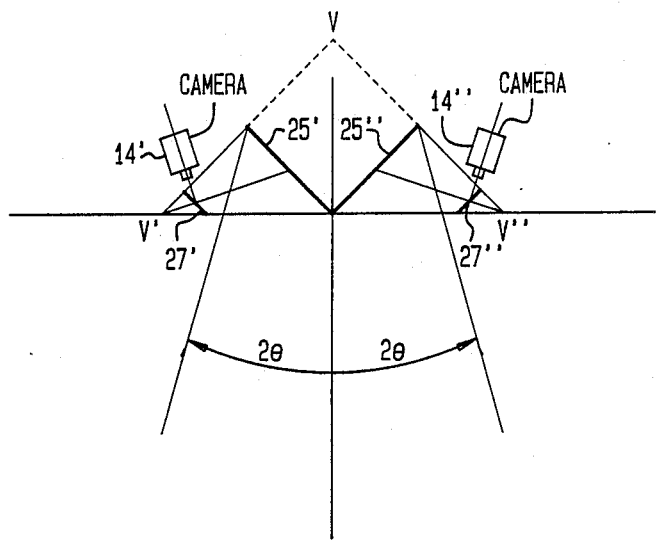

As shown in FIG. 7, the image reversal problem caused by the mirrors 25′,25″ can be solved through use of the mirrors 27′,27″ which are oriented at an angle of 45° to the line V′PV″. Thus, in FIG. 7, the cameras 14′,14″ have locations equivalent to the locations V′,V″ except that there are now two image reversals provided by the mirrors 27′,27″ and 25′,25″ to provide a net effect of no reversal. Note that the fields of view provided by the two cameras are entirely contiguous over all distances of interest and appear to originate from point V.

Figure 8:
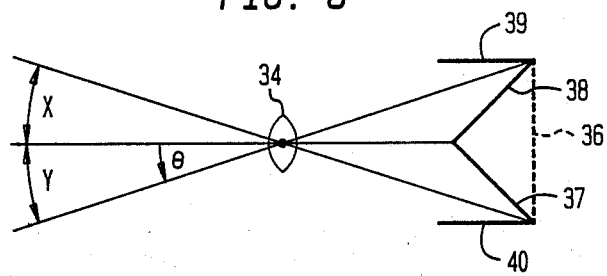
FIG. 8 schematically illustrates an arrangement utilizing a plurality of mirrors and image sensors for forming a high resolution video image, in accordance with an illustrative embodiment of the present invention.

As an alternative configuration for producing a high resolution video image from a plurality of image sensing devices, consider the arrangement of mirrors and sensors placed behind a single lens as shown in FIG. 8. In FIG. 8, the lens 34 forms an image of angular width $2\theta$ on the virtual image plane 36. To obtain high resolution, it is not possible to place a plurality (e.g. two) sensors such as CCD devices side-by-side in the virtual image plane 36. The reason is that the active region of each of the devices is surrounded by a non-active border. If two devices were placed side-by-side in the virtual image plane there would be an inactive area just in the middle of the virtual image plane. The inactive area would be occupied by the borders of the adjoining sensing devices. To solve this problem, the mirrors 37,38 which each have an acceptance angle of $\theta$ reflect the image radiation onto the sensors 39,40 which are positioned opposite one another. In this manner no image radiation is lost because of the border areas surrounding the active regions of the sensors 39,40. The sensors 39,40 when positioned as shown in FIG. 8, may be viewed as having contiguous fields of view X and Y. Thus, when the images produced by the sensors 39,40 are placed adjacent one another on a display device a single continuous high resolution image results.

Figure 9:
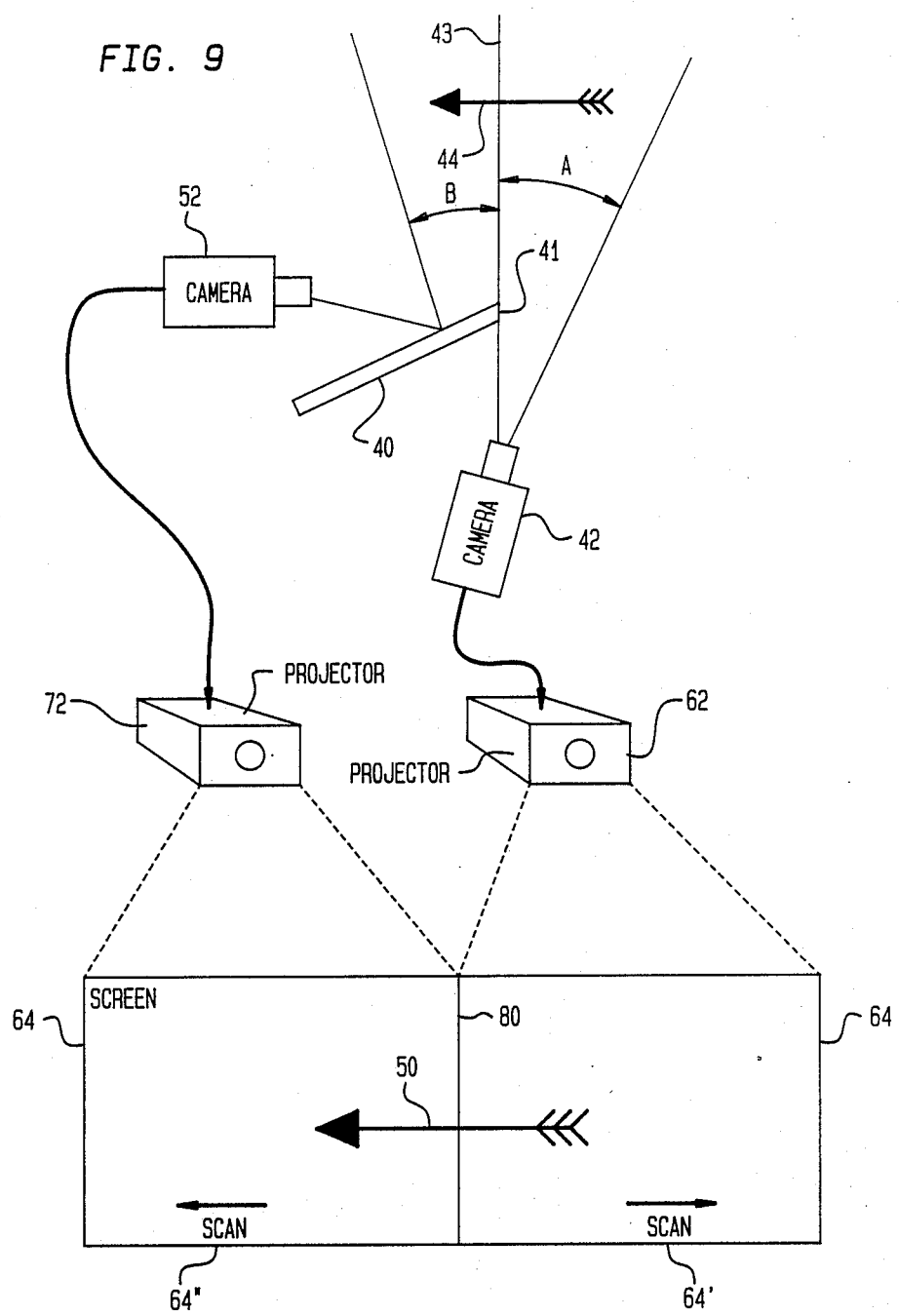
FIG. 9 schematically illustrates a third mirror and camera arrangement for forming a high resolution video image, in accordance with an illustrative embodiment of the present invention.

An alternative, mirror and camera arrangement for forming a high resolution video image is illustrated in FIG. 9. The arrangement of FIG. 9 utilizes cameras 42 and 52 and mirror 40. The cameras 42,52 and the mirror 40 are used to segment on object 44 to form a high resolution image thereof. A front-surface of mirror 40 is positioned so that edges 41 just permits the leftmost edge of the field of view A of camera 42 to observe the vertical center line 43 of the object 44. Preferably, the edge 41 is a sharply beveled edge. The relative orientation of mirror 40 and camera 52 are adjusted so that the rightmost edge of the field of view B of camera 52, upon reflection from mirror 40, also just sees the center line 43. Thus, the fields of view of the two cameras 42,52 are contiguous and appear to originate from the same location. Fine positional adjustments can now be made to insure that there is no overlap in the two fields of view.

Note that the camera 42 and 52 are connected respectively to the projectors 62,72 so that the sub-images 64′,64″ produced by the projectors 62,72 form a single high resolution image 64 of the object 44. The image 64 is formed through the combination of the two adjoining sub-images 64′,64″.

Referring again to FIG. 9, note that while camera 42 scans its half of the object normally, i.e. from the center of the arrow's shaft toward its tail, the mirror 40 reverses the scan of camera 52 so it scans from the center of the arrow's shaft outward towards the head of the arrow. To correctly display the two image halves, 64′,64″ the projector 72 associated with camera 52 preferably has its scan direction reversed. By reversing the scan of video projector 72, its half-image half is displayed correctly. Note that the scan for each half-image 64′,64″ begins at the center line 80 of the display 64 and moves out to the edges, the center image merge line 80 being the start of the video scan line for each half-image.

This fact can be used advantageously to correct for the poor video image at the beginning of each scan line in typical video camera. In television receivers the display screen is typically overscanned so the edges of the video image produced by the camera are not seen by the viewer. In FIG. 9, however, the scan edges are right in the center of the display and may result in poor video quality along the central join line 80 between left and right image halves.

Figure 10A:
FIGS. 10a, 10b and 10c schematically illustrate circuitry for eliminating sub-image combination artifacts resulting from use of the system of FIG. 9, in accordance with an illustrative embodiment of the present invention.
Figure 10B:
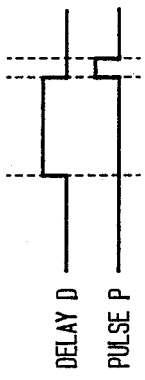
Figure 10C:
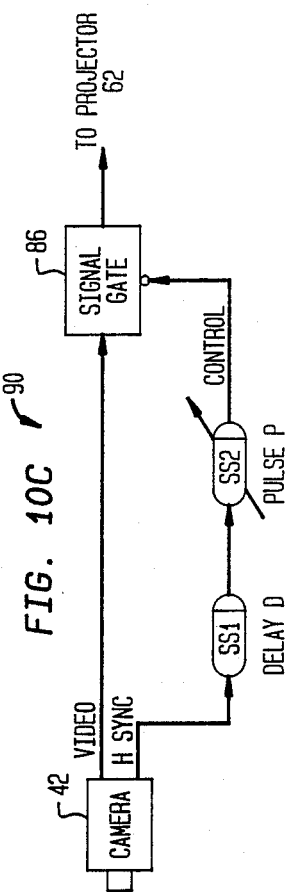

This can be corrected by video signal gating circuitry as shown in FIGS. 10a, 10b and 10c. If the pointing angles of the two cameras of FIG. 9 are adjusted so their fields of view overlap somewhat along the object center line 43, then the displayed images will also overlap, and it will be within that overlap region that all of the poor quality of each scan line from both cameras will be found.

A portion of a video signal is shown in FIG. 10a. The video signal for each horizontal scan comprises a horizontal sync pulse 82, a color burst 83, and video information 84.

Turning to FIG. 10c gating circuitry 90 is illustrated. A gating circuit such as gating circuit 90 is associated with each camera 42,52 and serves to crop the horizontal scan of the camera. FIG. 10c shows only the gating circuit associated with camera 42.

A first pulse generator SS1 is triggered by the leading edge of the horizontal sync pulse 82 from camera 42, generating a pulse D (see FIG. 10b) that ends immediately after the color burst 83. The trailing edge serves to trigger a second pulse generator SS2, to generate a video blanking pulse P (see FIG. 10b) of adjustable duration. The pulse P drives signal gate 86 to delay the onset of displayed video, by blanking some of the video information signal 84 at the beginning of each scan line. By providing a similar gating circuit for the video from camera 52, and adjusting the two blanking pulse widths, the overlapping video can be "cropped" away from both halves of the display, and the center line 80 where the two image halves are joined, will start with high-quality video signal.

C. Arrays for Forming High Resolution Video Images

In addition to using the camera and mirror arrangements discussed above, a high resolution video image may be formed using an array of image pickup devices. Each image pickup device, itself, contains an array of pixel elements. Such a mechanism for forming a high resolution video image is illustrated in FIG. 11.

Figure 11:
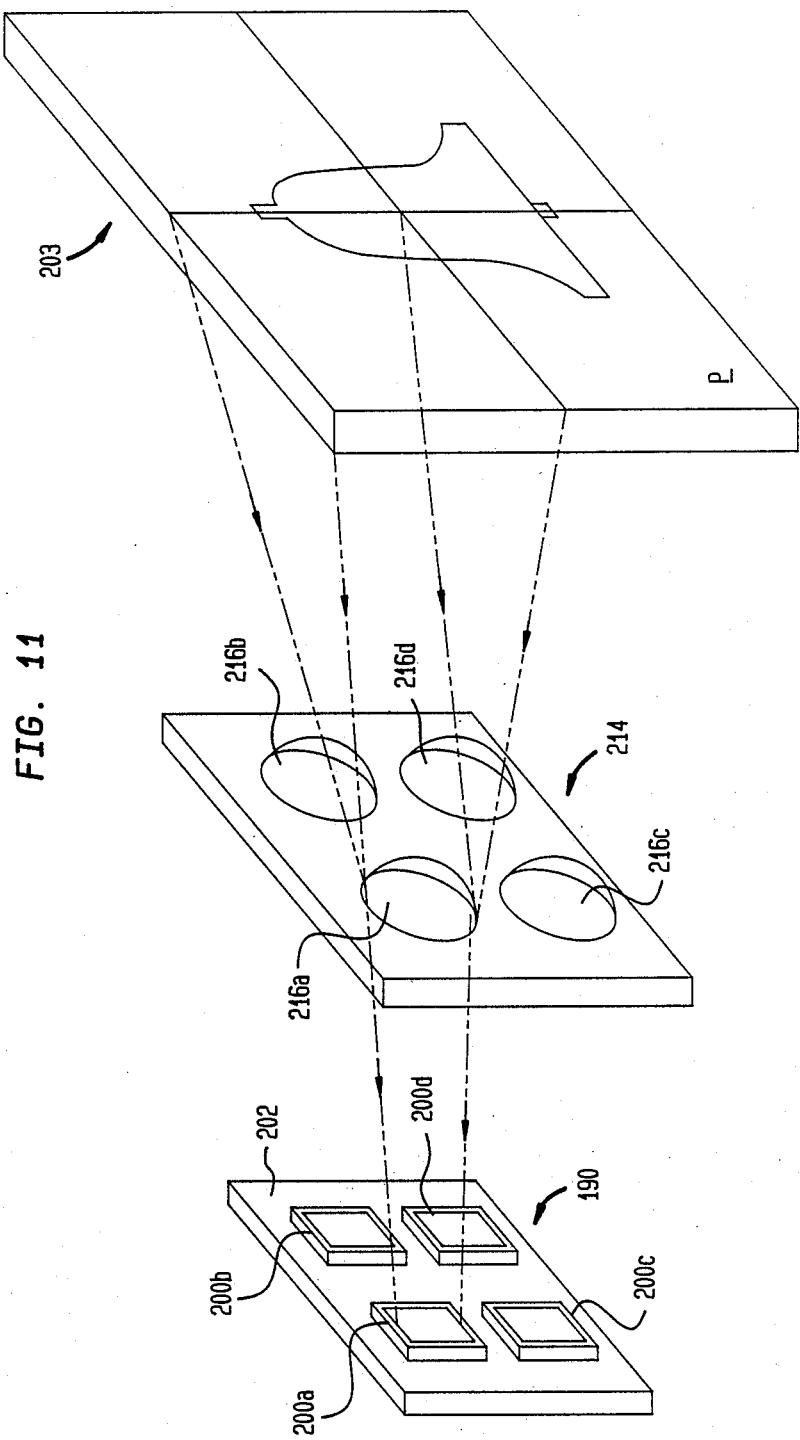
FIGS. 11, 12 and 13 schematically illustrate the use of an array of image pickup devices to form a high resolution video image, in accordance with an illustrative embodiment of the present invention.
Figure 12:
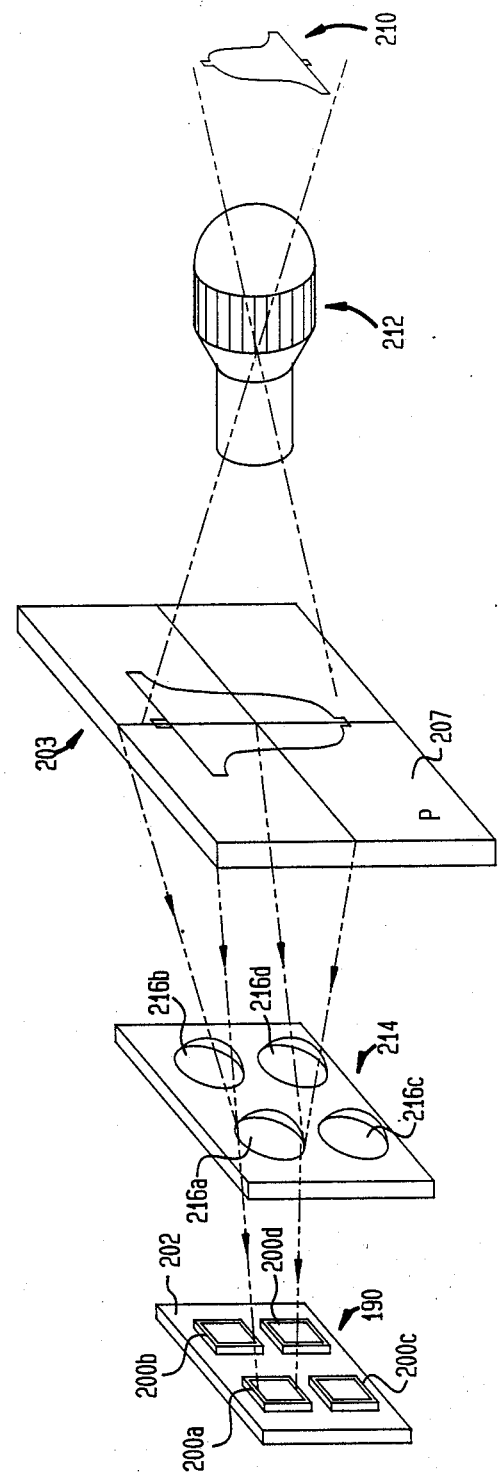

In FIG. 11, an array 190 of image pickup devices such as CCD devices are illustrated. The array 190 comprises a plurality of image pickup devices 200a, 200b, 200c, 200d. The image pick up devices are mounted in a fixed plate 202. An object 203 to be scanned is located in plane P. Illustratively, the object is a document. Alternatively, as shown in FIG. 12 the object 203 may be formed by focusing an image of a distant object 210 on a translucent screen 207 located in plane P by means of a telephoto lens system such as the lens 212. Located between the image pickup device array 190 and the plane P is a lens array 214. The lenses 216a, 216b, 216c and 216d of the lens array 214 are associated with the devices 200a, 200b, 200c, 200d, respectively. Each device 200a, 200b, 200c, 200d scans a portion (e.g. one fourth) of the object. Thus the object is represented by four times the number pixels as would be available using a single camera alone. By using more image pick up devices, arbitrarily higher resolutions can be achieved.

Figure 13:
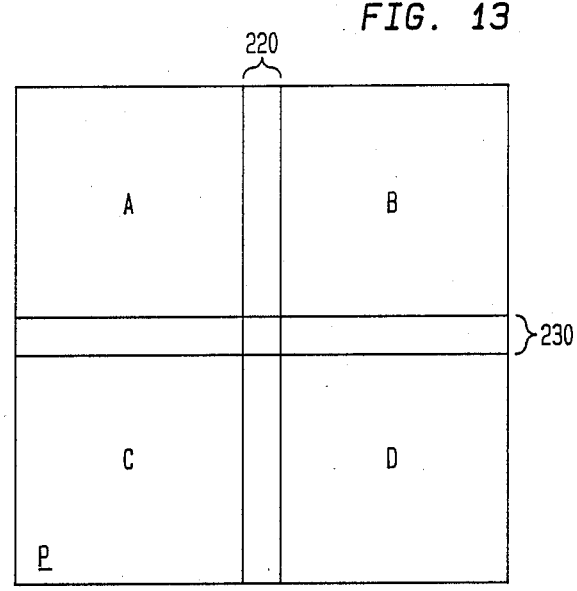

As shown in FIG. 13, the plane P is positioned so that there is an overlap in the area A, B, C, D that would normally be scanned by the image pick up devices 200a, 200b, 200c, 200d, respectively. The area of horizontal overlap (i.e. pixel overlap) is designated 220 and the area of vertical overlap (i.e. line overlap) is designated 230 in FIG. 2.

It is desirable to crop the scanning ranges of the image pickup devices 200a, 200b, 200c, 200d both vertically and horizontally to eliminate the overlap and so that the sub-images formed by the individual image pickup devices merge together to form a single continuous high resolution display.

Illustratively, such cropping might be accomplished by a cross correlation process. The cross correlation process may be understood in connection with FIG. 14. FIG. 14 shows the pixels comprising image pickup devices 200a and 200b. Illustratively, the device 200a scan N pixels per line and the device 200b scans N pixels per line. The pixels O,N-9...N of the top line of device 200a are shown in FIG. 14. Similarly, the pixels 0,1...9,...N of the top line of device 200b are shown in FIG. 13. Because the devices 200a, 200b scan overlapping areas (i.e. the upper part of area 220 of FIG. 14) some of the pixels at the right of device 200a and some of the pixels at the left of device 200b contain overlapping information. It is desirable to crop the scanning of the image pickup device 200a, 200b to eliminate the overlap and so that the images produced by the respective image pickup devices on a display join seamlessly. To accomplish this an arbitrary region 250, for example, twenty pixels wide is established. The region 250 includes the last ten pixels of each line of device 200a (i.e. pixels N-9, N-8...N) and the first 10 pixels of each line of device 200b. For each horizontal scan line, each pixel in the region 250 from device 200a is compared with all pixels in the region 250 from device 200b. If, for example, pixel N-5 of the top line of device 200a correlates maximally with pixel 5 of the top line of device 100b, then for the top line, the scanning of camera 200a is cropped at pixel N-5 on the right and the scanning of camera 200b is cropped at pixel 5 on the left. The process may be repeated for each line in devices 200a and 200b to form a seamless join of the images produced by the two devices. Alternatively, a more approximate join may be achieved by performing the correlation process for only a few lines and cropping the scans on each line by an average number of pixels.

A similar correlation process may be used to form a join between the images of devices 200c and 200d. Similarly, the scans of the devices 200a and 200c are cropped vertically to form a seam between the images produced by devices 200a and 200c. In this case, each line from a group of lines from the bottom of device 200 a is compared with a group of lines from the top of device 200c, and cropping takes place at the lines with the highest correlation. A similar process is used to form a smooth joint between the images of devices 200b and 200d.

Although the cross correlation process may take a significant time to carry out, it need only be carried out infrequently such as the power up of the equipment and thereafter at periodic intervals to compensate for time and temperature induced drift in the electronics.

Figure 15:
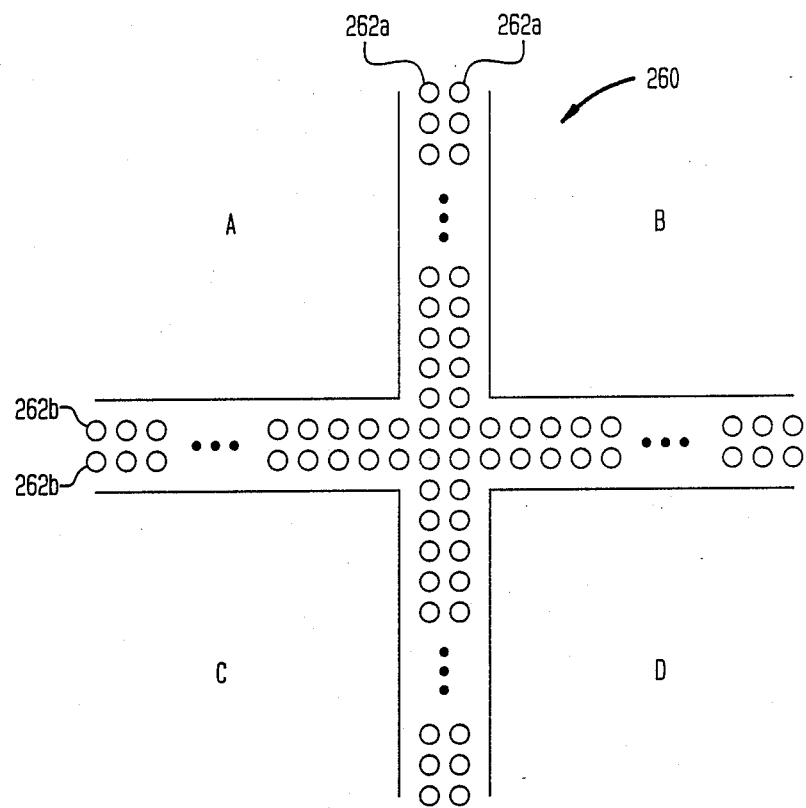

An alternative method for cropping the vertical and horizontal scans of the camera 200a and 200b involves use of an alignment device. Such an alignment device is shown in FIG. 15. The device comprises a cross-shaped template 260 which is positioned to coincide with overlap areas 220, 230 of FIG. 13 and which comprises a plurality of apertures 262a, 262b which can selectively pass light. The apertures are arranged in a plurality of rows and columns. Illustratively, as shown in FIG. 15, there are two horizontal rows comprising apertures 262b and two vertical rows comprising apertures 262a. Illustratively, the apertures are formed using liquid crystal devices with the entire template 260 being illuminated from the rear. For each join to be formed (i.e. between devices 200a, 200b, and 200a, 200c, and 200c, 200d, and 200b, 200d) one or more apertures are opened to allow light to pass. Each device marks the position where it first "sees" the illuminated aperture in its field of view. The scanning is cropped for each camera at this point.

More particularly, to crop the horizontal scan of the two adjoining devices (e.g. 200a, 200b), for each line, one of the apertures 262a is illuminated. The pixel location at which the illuminated aperture is detected by device 200a is noted and the pixel location at which the illuminated aperture is detected by device 200b is noted. Thus for example, the top line of camera 200a may detect the illuminated aperture at pixel N-5 (see FIG. 14) and top line of camera 200b may detect the illuminated aperture at pixel 5. These pixel values determine the horizontal scan cropping in the top row of the image pickup devices 200a, 200b. This procedure may be repeated for each line so that the horizontal scans of lines can be cropped individually. Alternatively, the procedure can be performed a small number of times and average pixel value used for the cropping.

Similarly, scan cropping in the vertical direction may be determined by illuminating a horizontal row of apertures and detecting at which horizontal row the illuminated apertures are detected. Thus, for example, if device 200a has M rows of pixels and the illuminated row of apertures is detected in row M-5, rows M-4...M are cropped. Similarly, if device 200c (which is located below camera 200a) detects the illuminated apertures in row 5, rows 0-4 are cropped.

More than one vertical row of apertures and more than one horizontal row of apertures are provided to insure a high quality match. For example, pixel N-5 in the top row of device 200a may detect a particular aperture at 90% maximum brightness while the aperture may be detected by pixel 5 of the top row of device 200b with brightness of only 60%. This, for example, may be due to a sensitivity problem near the boundary of the device 200b. Thus, the scan boundary determination procedure should be repeated with an aperture in a slightly different location.

CONCLUSION

A teleconferencing system including teleconferencing stations which utilize a high resolution display have been disclosed along with arrangements for implementing the high resolution display.

Finally, the above described embodiments of the invention are intended to be illustrative only. Numerous alternative embodiments may be devised by those skilled in the art without departing from the spirit and scope of the following claims.

What is claimed is:

1. A station for use in a teleconferencing system comprising
   display means for displaying a first high resolution video image formed from a plurality of adjoining first sub-images transmitted to said station from a remote location,
   image sensing means for producing at said remote location a second high resolution video image comprising a plurality of second sub-images, said image sensing means comprising a plurality of individual image sensing devices, each of which produces one of said second sub-images, and means for eliminating overlap between adjoining ones of said second subimages, and
   means for transmitting audio signals to and receiving audio signals from said remote location via a plurality of two way audio channels.
   wherein said image sensing means comprises first and second video image sensing devices having first and second fields of view, respectively, and mirror means for insuring that said fields of view are contiguous over a range of distances from said image sensing devices so that the sub-images produced by said first and second image sensing devices do not develop.

2. A station for use in a teleconferencing system comprising
   display means for displaying a first high resolution video image formed from a plurality of adjoining first sub-images transmitted to said station from a remote location,
   image sensing means for producing at said remote location a second high resolution video image comprising a plurality of second sub-images, said image sensing means comprising a plurality of individual image sensing devices, each of which produces one of said second sub-images, and means for eliminating overlap between adjoining ones of said second subimages, and
   means for transmitting audio signals to and receiving audio signals from said remote location via a plurality of two way audio channels,
   wherein said image sensing means comprises first and second image sensing devices for scanning first and second overlapping fields of view, respectively, and means for cropping the scanning of said first and second fields of view by said first and second image sensing devices so that the sub-images formed by said first and second image sensing devices do no overlap and merge continuously to form a single high resolution image.

3. An arrangement for forming a single high resolution video image comprising:
   first and second video image sensing devices having distinct spatial locations, said first and second video image sensing devices being adapted to scan first and second fields of view, respectively, and being adapted to form first and second sub-images, respectively, said first and second image sensing devices being positioned so that said first and second fields of view overlap, and
   means for cropping the scanning of said first and second image sensing devices so that said first and second sub-images do not overlap and merge continuously to form said single high resolution image.

4. A station for use in a teleconferencing system comprising
   display means for displaying a first high resolution video image formed from a plurality of adjoining first sub-images transmitted to said station,
   image sensing means for producing at a remote location a second high resolution video image comprising a plurality of second sub-images, said image sensing means comprising a plurality of individual image sensing devices, each of which produces one of said second sub-images, and
   means for transmitting audio signals to said remote location,
   wherein said image sensing means comprises first and second image sensing devices for scanning first and second fields of view respectively, and mirror means for insuring that said fields of view are contiguous over a range of distances from said image sensing devices so that the sub-images produced by said first and second image sensing divides merge continuously into said second high resolution image.

5. The station of claim 4 wherein said mirror means comprises first and second adjacent planar mirrors oriented at a predetermined angle to one another.

6. The station of claim 5 wherein said angle is 90°.

7. The station of claim 5 wherein said mirror means further includes third and four mirrors oriented to eliminate an image reversal caused by said first and second mirrors.

8. The station of claim 4 wherein said mirror means comprises a single planar mirror positioned so that the field of view of one of said image sensing devices is reflected by said mirror and so that an edge of the field of view of the other of said image sensing devices intersects an edge of said mirror.

9. A station for use in a teleconferencing system comprising
   display means for displaying a first high resolution video image formed from a plurality of adjoining first sub-images transmitted to said station,
   image sensing means for producing at a remote location a second high resolution video image comprising a plurality of second sub-images, said image sensing means comprising a plurality of individual image sensing devices, each of which produces one of said second sub-images, and
   means for transmitting audio signals to said remote location,
   wherein said image sensing means comprises first and second image sensing devices for scanning first and second overlapping fields of view, respectively, and means for cropping the scanning of at least one of said fields of view by at least one of said first and second image sensing devices so that the sub-images formed by said first and second image sensing devices merge continuously.

10. The station of claim 9 wherein said cropping means comprises a gating circuit which blanks a portion of the information signal at the beginning of each scan line of said at least one of said image sensing devices.

11. A teleconferencing station for use in a teleconferencing system comprising
    first and second video display devices for receiving first and second video signals generated by first and second low resolution video imaging devices having first and second spaced apart positions at a location remote from said teleconferencing station and substantially contiguous fields of view, said first and second video display devices displaying first and second low resolution sub-images, respectively, in response to said first and second video signals, said first and second low resolution sub-images being displayed in adjoining positions so that they merge contiguously along a boundary to form a first high resolution video image, third and fourth low resolution video imaging devices having third and fourth spaced apart locations at said station for generating third and fourth video signals corresponding to third and fourth low resolution video sub-images for transmission to said remote location for formation of a second high resolution video image from said third and fourth low resolution sub-images at said remote location, and means for transmitting audio signals between said station and said remote location.

12. The teleconferencing station of claim 11 wherein said first and second display devices comprise first and second video projectors, respectively.

13. The teleconferencing station of claim 11 wherein the fields of view of said third and fourth video imaging devices are slightly overlapped.

14. The teleconferencing station of claim 13 wherein said station includes means for cropping a scanning operation of at least one of said third and fourth video imaging devices to eliminate said overlap in said fields of view.

* * * * *

UNITED STATES PATENT AND TRADEMARK OFFICE
CERTIFICATE OF CORRECTION

PATENT NO. : 4,890,314

DATED : Dec. 26, 1989

INVENTOR(S) : Judd et al.

It is certified that error appears in the above-identified patent and that said Letters Patent is hereby corrected as shown below:

Column 1, line 8, "including high" should read --including a high--.
Column 2, line 7, "or prior" should read --of prior--.
Column 2, line 53, "form" should read --from--.
Column 4, line 32, "110" should read --100--.
Column 5, line 58, "9020" should read --90°--.
Column 7, line 44, "segment on" should read --segment an--.
Column 7, line 46, "edges" should read --edge--.
Column 7, line 57, "camera" should read --cameras--.
Column 9, line 10, "area" should read --areas--.
Column 9, line 27, "scan" should read --scans--.
Column 9, line 62, "200 a" should read --200a--.
Column 12, line 20, "divides" should read --devices--.
Column 12, line 60, "the information" should read --the video information--.

Signed and Sealed this

Twenty-fifth Day of August, 1992

Attest:

DOUGLAS B. COMER

Attesting Officer

Acting Commissioner of Patents and Trademarks